United States Patent
Kuhne et al.

[11] 3,783,718
[45] Jan. 8, 1974

[54] MACHINE FOR ROUGH-AND/OR FINISH-TURNING OF HEAVY WORKPIECES

[75] Inventors: Wolfgang Kuhne, Dortmund-Huckarde; Hubert Goletz, Bergkamen, both of Germany

[73] Assignee: Hoesch Maschinenfabrik Deutschland AG, Dortmund, Germany

[22] Filed: Jan. 27, 1972

[21] Appl. No.: 221,188

[30] Foreign Application Priority Data
Feb. 1, 1972   Germany............... P 21 04 534.1

[52] U.S. Cl............................ 82/2 R, 82/8, 82/11, 82/28 R, 51/49
[51] Int. Cl............................................. B23b 5/08
[58] Field of Search................. 82/8, 28, 2 R, 30, 82/11; 51/49

[56] References Cited
UNITED STATES PATENTS

| | | | |
|---|---|---|---|
| 3,345,892 | 10/1967 | Dombrowski............................ | 82/8 |
| 1,670,109 | 5/1928 | Floeter..................................... | 82/8 |
| 3,096,674 | 7/1963 | Sieger..................................... | 82/28 |
| 3,533,316 | 10/1970 | Porath..................................... | 82/30 X |
| 3,058,559 | 10/1962 | Ohrnberger............................. | 82/30 X |

Primary Examiner—Leonidas Vlachos
Attorney—Michael S. Striker

[57] ABSTRACT

A heavy-duty machine for rough- and/or finish-turning of heavy workpieces has a bed to which is bolted a headstock and which reciprocably supports a tailstock. The spindles in the headstock and tailstock are rotatable in hydrostatic bearings and the tailstock is provided with hydrostatic ways which are parallel to the common axis of the spindles. The main transmission of the turning machine has a discrete casing mounted behind the headstock and supporting the main motor which rotates the spindle of the headstock by way of the transmission and a coupling for transmitting torsion only which connects the output element of the transmission with the headstock spindle. The output shaft of the main motor is located in a vertical plane which includes the common axis of the two spindles. The outer dimensions of the housing of the headstock match the outer dimensions of the housing of the tailstock. The headstock, the tailstock, the transmission, the main motor and the coupling have halves which are mirror symmetrical with reference to the aforementioned plane.

10 Claims, 4 Drawing Figures

PATENTED JAN 8 1974　　　　　　　　　　　　3,783,718

MACHINE FOR ROUGH-AND/OR FINISH-TURNING OF HEAVY WORKPIECES

BACKGROUND OF THE INVENTION

The present invention relates to machine tools in general, and more particularly to improvements in heavy-duty machines for carrying out turning operations on bulky and heavy workpieces, such as large rolls consisting of steel or chilled iron, large turbine rotors, crank shafts for diesel engines of ships and the like. Still more particularly, the invention relates to improvements in heavy-duty machines which are used for rough and finish-turning of heavy workpieces and are preferably controlled by a programming system.

Heavy-duty turning machines are desirable for certain types of operations in order to insure the making of deep cuts, for example, in the machining of large and bulky rolls or the like. A drawback of presently known programmed heavy-duty machines for rough-turning of heavy metallic workpieces is that, when the tools on the tool-supporting structure of the machine are set to make deep cuts in order to rapidly remove substantial quantities of surplus material, the wear on the parts of the machine is so extensive that the final dimensions of workpieces deviate considerably from the desired dimensions after relatively short periods of use of the machine. Therefore, many manufacturers employ discrete rough-turning and discrete finish-turning machines, i.e., a blank is first treated in a rough-turning machine which removes the major part of surplus material, and the thus obtained semifinished blank is thereupon treated in a finish-turning machine. Of course, such two-stage operation can be carried out only in those plants which are equipped with at least two discrete turning machines of required size.

It is further known to provide a programmed heavy-duty turning machine with detectors or measuring heads which are connected with the programming unit of the machine and serve to continuously scan and report the actual positions of one or more tools on the tool-supporting structure of the machine. The detectors are normally mounted on the carriages of a tool slide which is installed between the headstock and the movable tailstock of a heavy-duty turning machine. Such machines exhibit the drawback that the wear on guide means for the carriages of the tool-supporting structure adversely influences the accuracy of finish of the treated workpieces. For example, if a tool is caused to move in a horizontal plane longitudinally and/or transversely of the axis of the headstock spindle, any wear on the guide means which extends in parallelism with the spindle immediately results in an increase or in a reduction of the diameter of the treated portion of a workpiece which is held between the centers of the headstock spindle and tailstock spindle. The wear on the guide means which extends transversely of the axis of the headstock spindle is less damaging because minor vertical shifting of the tool exerts a relatively minor influence on the diameter of the treated portion of a workpiece. Similar observations apply for obliquely mounted guide means for tool carriages; the wear upon the guide means for such carriages results in a highly undesirable horizontal shifting and in a less damaging vertical shifting of the tool with reference to the workpiece.

The accuracy of finish of the workpieces also depends on the wear upon the bearings for the headstock spindle and tailstock spindle.

Attempts to counteract the aforediscussed drawbacks of conventional programmed heavy-duty turning machines include the provision of hydrostatic guide means for the longitudinal and tranverse carriages of the tool-supporting structure as well as the provision of hydrostatic bearings for the headstock spindle and tailstock spindle. An advantage of hydrostatic guide means and bearings is that they are not subject to wear. However, it was found that such means are not always sufficient to insure that the configuration and dimensions of each of a series of finished articles correspond to the desired configuration and dimensions with a desired degree of accuracy. This is due to the fact that the ultimate dimensions of heavy articles which are treated in heavy-duty turning machines also depend on deformation of the headstock and/or tailstock when the machine is in use. The deformation of headstock and/or tailstock is normally caused by heat which develops mainly during rough-turning. Thus, the position of the axis of the spindle in the headstock and/or tailstock is likely to change if the removal of heat which develops during rough-turning is irregular or in the event of localized generation of heat. The deviations of dimensions of a rough-turned workpiece in a machine wherein the removal of heat is unsatisfactory are compensated for, to a certain extent, during the next-following finish-turning because the generation of heat is reduced so that the headstock and/or tailstock is allowed to reassume its original shape; however, this takes place only if the rough-turning and finish-turning operations are carried out in the same machine and if finish-turning operation begins before the deformation of the headstock and/or tailstock (which developed during rough-turning) is eliminated as a result of cooling.

In order to prevent the undesirable influence of heat from directly affecting the headstock, certain turning machines employ a headstock which is mounted separately of the main transmission and main prime mover. Such reduction of adverse thermal effects is normally satisfactory in smaller turning machines but not in those which are used for the turning of very heavy and bulky workpieces.

SUMMARY OF THE INVENTION

An object of the invention is to provide a novel and improved heavy-duty turning machine which can be utilized for rough-turning and/or finish-turning of heavy workpieces with a much higher degree of accuracy than in heretofore known heavy-duty turning machines and wherein the accuracy of finish is not affected (or is affected much less than in conventional machines) by prolonged use, influence of heat and/or the effects of wear.

Another object of the invention is to provide a programmed heavy-duty rough and/or finish-turning machine with a headstock, a tailstock and certain other component parts which are mounted in a novel and improved way to eliminate or to at least reduce the drawbacks of conventional machines.

A further object of the invention is to provide a heavy-duty turning machine with novel and improved means for mounting the rotary and reciprocable components to reduce the effects of heat and wear upon the quality of finished products.

The invention is embodied in a machine tool, particularly in a programmed heavy-duty machine for rough- and/or finish-turning of heavy and bulky metallic workpieces, which comprises a frame including a bed, a headstock and a tailstock both mounted on the bed, a horizontal spindle rotatably mounted in the headstock, a discrete main transmission mounted on the bed and having rotary input and output elements, coupling means for transmitting torsion only connecting the output element of the main transmission with the spindle, and prime mover means for rotating the input element of the main transmission. In accordance with a feature of the invention, the headstock, the tailstock, the main transmission and the coupling means have halves which are mirror symmetrical with reference to a vertical plane including the axis of the spindle in the headstock.

In accordance with another feature of the invention, the main transmission comprises a casing which is secured to the bed of the frame and the prime mover means includes a preferably electric motor mounted on the casing of the main transmission. The motor has an output shaft which drives the input element of the main transmission by way of a second transmission and whose axis is located in the aforementioned vertical plane.

In accordance with a further feature of the invention the headstock comprises a first housing and the tailstock comprises a second housing which is reciprocable toward and away from the headstock and whose outer dimensions match or at least closely approach those of the first housing.

The machine tool further embodies certain additional features some of which are also employed in heretofore known heavy-duty turning machines but which, together with the above outlined features, contribute to more accurate finish of workpieces irrespective of the length of use of the improved machine tool.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
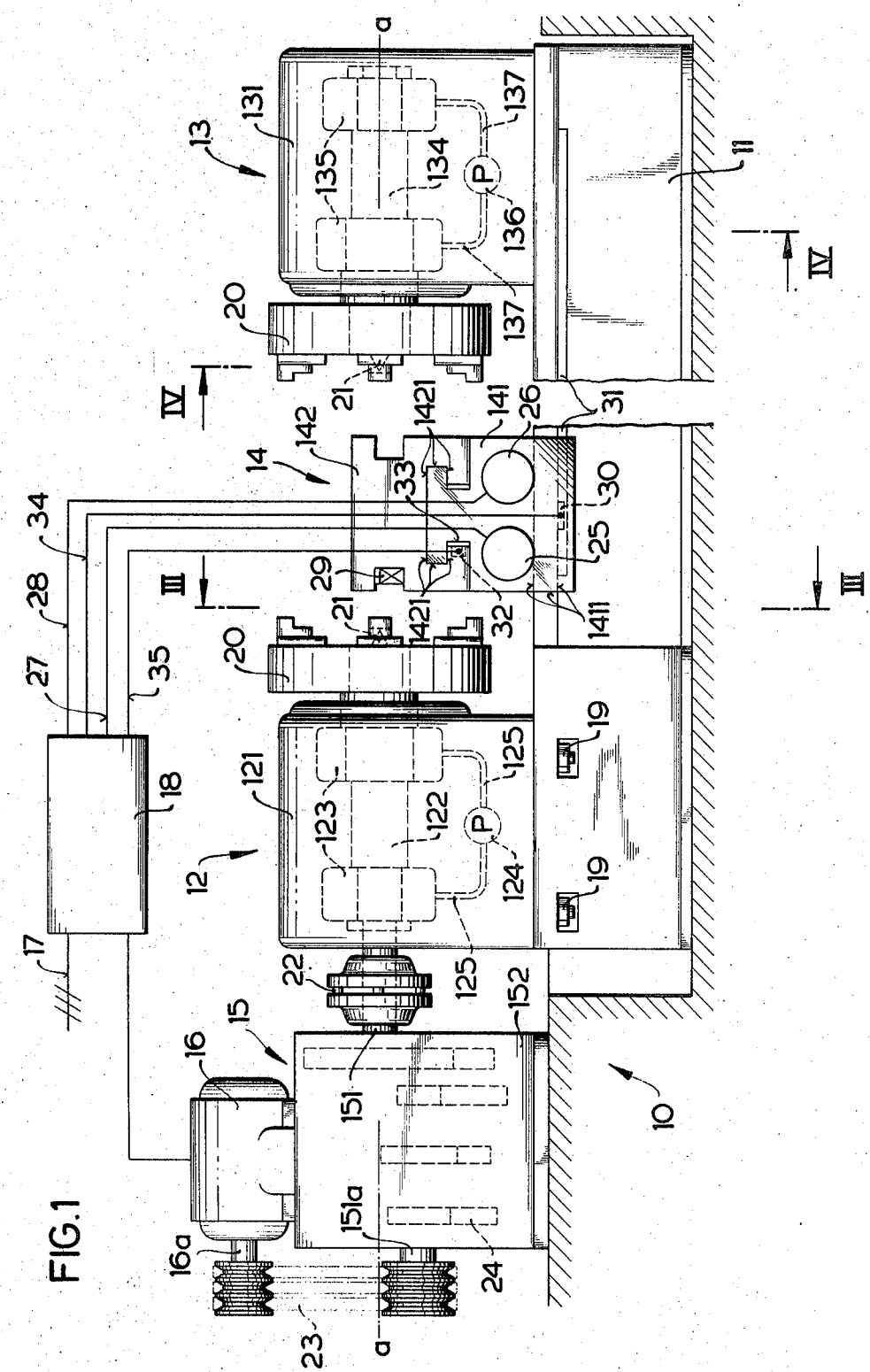
FIG. 1 is a diagrammatic side elevational view of a machine for rough and/or finish-turning of heavy workpieces which embodies the invention.
Figure 2:
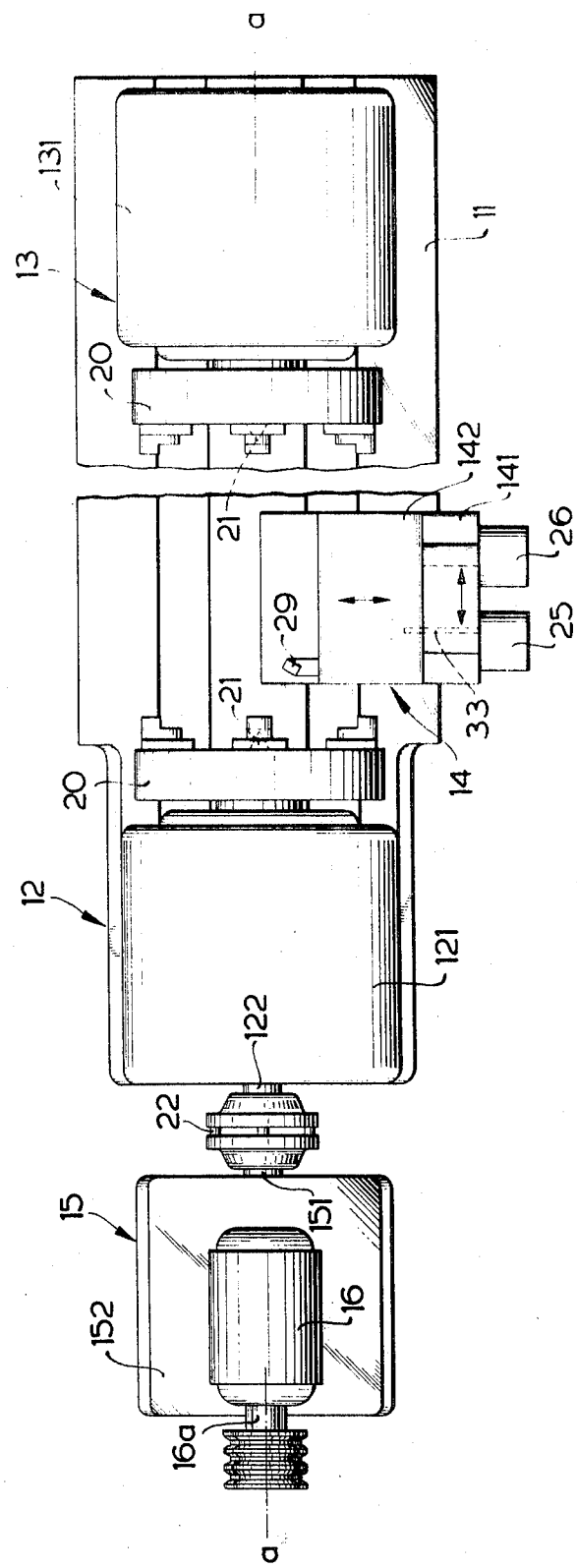
FIG. 2 is a plan view of the machine.
Figure 3:
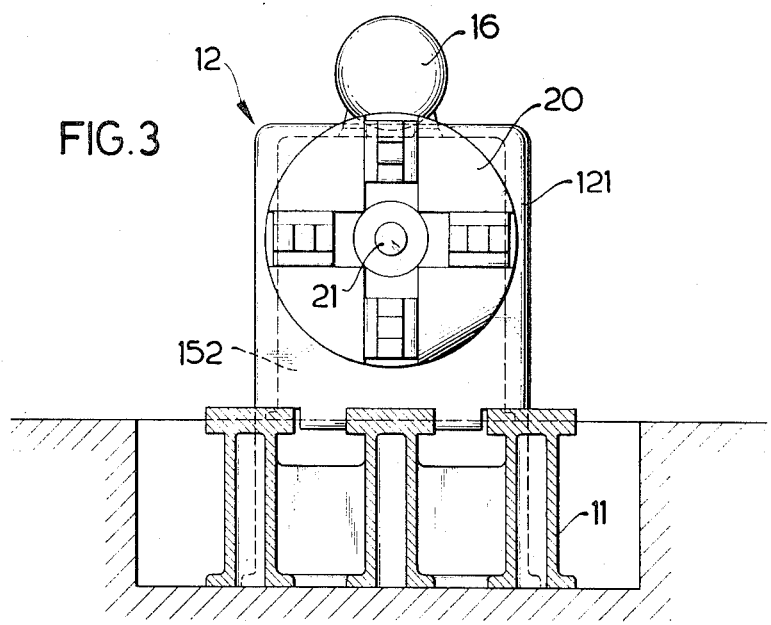
FIG. 3 is a transverse vertical sectional view substantially as seen in the direction of arrows from the line III—III of FIG. 1.

Referring first to FIGS. 1 and 2, there is shown a programmed heavy-duty turning machine 10 which comprises a frame including a base or bed 11, a headstock 12, a tailstock 13 which is reciprocable toward and away from the headstock 12 along guide means or ways provided therefor on the bed 11, a tool slide 14 which is reciprocable on the bed 11 between the headstock 12 and tailstock 13, a main transmission 15 which is mounted on the bed 11 behind the headstock 12, a main prime mover 16 which is mounted on the casing 152 of the main transmission 15, and a programming unit 18 which is connected with a source 17 of electrical energy. The housing 121 of the headstock 12 is secured to the bed 11 by screws and nuts 19 or analogous fasteners to prevent any shifting or lifting of the headstock relative to the frame.

Figure 4:
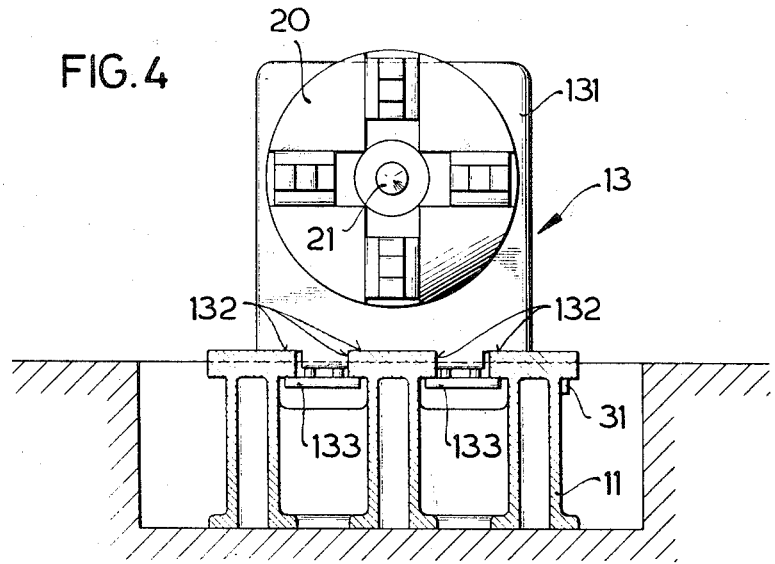
FIG. 4 is a transverse vertical sectional view substantially as seen in the direction of arrows from the line IV—IV of FIG. 1.

The housing 131 of the tailstock 13 is provided with hydrostatic guide means 132 (FIG. 4) which allow for shifting of the tailstock to and from its selected operative position relative to the bed 11. Once the tailstock 13 is moved to a selected operative position, it is fixedly held in such position by clamping devices 133 which secure the housing 131 to the bed 11. The housing 121, 131 respectively accommodate a headstock spindle 122 and a coaxial tailstock spindle 134; these spindles are respectively mounted in hydrostatic bearings 123, 135 which are supplied with a pressurized hydraulic fluid (such as oil) by pumps 124, 136 through the intermediary of pipes 125, 137. The front end portion of the tailstock spindle 134 is rigidly connected with a disk-shaped face plate 20 and carries a dead center 21. A similar center 21 is provided on the headstock spindle 122.

A coupling 22 which transmits torsion only serves to connect the output shaft 151 of the transmission 15 with the headstock spindle 122. As shown, the casing 152 of the transmission 15 is a discrete part which is separate from the housing 121 of the headstock 12. The latter is mounted on the bed 11 between the tailstock 13 and the transmission 15. The main prime mover 16 includes an electric motor which is mounted on the casing 152; the axis of the output shaft 16a of such motor is horizontal and is located in a vertical plane a—a (see FIG. 1 or 2) which includes the axis of the headstock spindle 122. The axes of the output shaft 16a of the prime mover 16 and the spindle 122 are parallel to each other. The input shaft 151a of the transmission 15 receives torque from the output shaft 16a by way of a transmission 23 which can include one or more V-belts or one or more chains. The transmission 15 includes a power train 24, preferably a gear train, which transmits torque to the spindle 122 by way of the output shaft 151 and coupling 22. The inner end portion of the spindle 122 is rigidly connected with a second face plate 20 which is located opposite the face plate 20 on the tailstock spindle 134. A workpiece (not shown) which is mounted between the centers 21 of the spindles 122, 134 is rotated when the prime mover 16 is set in motion and the spindle 122 is driven by the torsional coupling 22.

As shown in FIG. 2, the two halves of the tailstock 13, headstock 12, torsional coupling 22, transmission 15 and prime mover 16 on the casing 152 are mounted mirror symmetrically with reference to the vertical plane a—a which includes the common axis of the spindles 122, 134 and the axis of the output shaft 16a. In other words, one-half of each of the components 12, 13, 15, 16, 22 is located at one side and the other half is located at the other side of the plane a—a. Furthermore, the external dimensions of the housing 131 of the tailstock 13 are preferably identical with the external dimensions of the housing 121 of the headstock 12.

The tool slide 14 comprises a lower carriage 141 which is reciprocable on the bed 11 between the face plates 20 in the direction of the common axis of the spindles 122, 134 and supports an upper carriage 142. The lower carriage 141 is provided with first hydrostatic guide means 1411 cooperating with the bed 11 and second hydrostatic guide means 1421 allowing the upper carriage 142 to move at right angles to the common axis of the spindles 122 and 134. The means for respectively moving the carriages 141, 142 lengthwise and transversely of the bed 11 comprises two electric motors 25, 26 which are electrically connected with the programming unit 18 by means of conductors 27, 28. The transmissions between the motor 25, 26 and the respective carriages 141, 142 may comprise worms and worm wheels or feed screws and nuts (not specifically shown); such transmissions constitute hydrostatic driving devices which can move the respective carriages through preselected distances in response to signals from the programming unit 18.

FIGS. 1 and 2 illustrate a turning tool 29 which is mounted on the upper carriage 142 of the tool slide 14. The means for tracking and selecting the position of the tool 29 as considered in the longitudinal direction of the bed 11 includes a detector 30 which is mounted on the lower carriage 141 and slides along a measuring and pulse transmitting bar 31. The latter extends in parallelism with the guide means 1411. The means for tracking and selecting the position of the tool 29 in a direction at right angles to the common axis of the spindles 122, 134 comprise a second detector 32 which slides along a second measuring and pulse transmitting bar 33. The detector 32 is mounted on the carriage 142 and the bar 33 is parallel to the guide means 1421. The detectors 30, 32 are connected with the programming unit 18 by way of conductors 34, 35.

An advantage of the coupling 22 is that it prevents the transmission of bending stresses to the headstock spindle 122. Such bending stresses normally develop if the output element of the main transmission transmits to the headstock spindle torque by way of a chain drive or a belt transmission. The bending stresses which develop in conventional machines wherein the output element of the main transmission is not aligned with the headstock spindle are likely to effect a shift in the position of the headstock spindle with attendant adverse effects upon the accuracy of finish of the articles.

The feature that the external dimensions of the housing 121 match or closely approach those of the housing 131 insures that the withdrawal of heat from the two housings takes place at the same rate. This reduces the likelihood of unequal deformation of the components 12, 13 and the adverse influence of such unequal deformation upon the quality of finished products.

The improved turning machine further insures that the accuracy of finish remains unchanged in each portion of a workpiece which is held between the face plates 20 of the spindles 122 and 134. The mirror symmetrical mounting of the halves of components 12, 13, 15, 16 and 22 with reference to the plane a—a further reduces the likelihood of adverse influence of heat (particularly such heat which develops during rough-turning) upon the equality of finished products. This is due to the fact that such mirror symmetrical mounting reduces the likelihood of appreciable shifting of the axes of spindles 122, 134 with and/or relative to each other, i.e., relative to the tool or tools on the slide 14. A coupling which can be used between the output element 151 of the main transmission 15 and the spindle 122 of the headstock 12 is disclosed, for example, in German patent No. 1 211 776.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a machine tool, particularly in a programmed heavy-duty machine for rough and/or finish-turning of heavy workpieces, a combination comprising a frame including a bed; a headstock and a tailstock mounted on said bed; a horizontal spindle rotatably mounted in said headstock; a discrete transmission mounted on said bed axially spaced from said headstock and having rotary input and output elements; coupling means for transmission of torsion only connecting said output element with said spindle; and prime mover means for rotating said input element; said headstock, said tailstock, said transmission and said coupling means having halves which are mirror symmetrical with reference to a vertical plane including the axis of said spindle.

2. A combination as defined in claim 1, wherein said transmission comprises a casing secured to said bed and said prime mover means comprises a single motor mounted on said casing and including an output shaft having an axis located in said plane.

3. A combination as defined in claim 1, wherein said headstock comprises a first housing and said tailstock comprises a second housing, said housings having identical external dimensions.

4. A combination as defined in claim 1, wherein said headstock comprises a first housing and hydrostatic bearing means provided in said first housing for said spindle, said tailstock comprising a second housing, a second spindle coaxial with said first mentioned spindle, and hydrostatic bearing means provided in said second housing for said second spindle.

5. A combination as defined in claim 1, further comprising tool slide means mounted on said bed between said headstock and said tailstock, said slide means comprising a lower carriage reciprocably mounted on said bed for movement in parallelism with said axis and a second carriage reciprocably mounted on said first carriage for movement at right angles to said axis.

6. A combination as defined in claim 5, further comprising first and second detector means respectively mounted on said first and second carriages for respectively scanning the position of a tool on one of said carriages in parallelism with and at right angles to said axis, and first and second bars for slidably guiding said first and second detector means, said first and second bars being respectively parallel with and normal to said axis.

7. A combination as defined in claim 1, wherein said tailstock is reciprocable along said bed toward and away from said headstock and comprises hydrostatic guide means cooperating with said bed to guide said tailstock for movement in parallelism with said axis.

8. A combination as defined in claim 1, wherein said transmission comprises a gear train for transmitting torque from said input element to said output element thereof.

9. A combination as defined in claim 2, further comprising a second transmission for transmitting torque from said output shaft to said input element.

10. A combination as defined in claim 1, wherein said headstock is located between said transmission and said tailstock and said prime mover means is mounted on top of said transmission.

* * * * *